Figure 1:

July 22, 1952  O. C. SLOTTERBECK ET AL  2,604,423
CELLOPHANE LAMINATED WITH STYRENE-ISOBUTYLENE COPOLYMER
Filed Oct. 6, 1944

— POLAR PLASTIC / HC PLASTIC

— BONDING LAYER

— FIBROUS MAT'L. IMPREGNATED WITH 1

— NON-TACKY WATERPROOFING FILM

— METAL

BRAID  RUBBER

Ober C. Slotterbeck
William H. Smyers   Inventors
David W. Young
By _____ Attorney Patented July 22, 1952

2,604,423

UNITED STATES PATENT OFFICE 2,604,423

CELLOPHANE LAMINATED WITH STYRENE-ISOBUTYLENE COPOLYMER

Ober C. Slotterbeck, Rahway, William H. Smyers, Westfield, and David W. Young, Roselle, N. J., assignors to Standard Oil Development Company, a corporation of Delaware Application October 6, 1944, Serial No. 557,506

4 Claims. (Cl. 154—46)

1

This invention relates to novel products and to preparation and use thereof, and more particularly it relates to the use of two different types of high molecular weight organic plastics and various uses thereof particularly in the form of laminated sheet materials, especially suitable as a colorless wrapping material.

One of the two primary materials used in making the products of this invention is a hydrocarbon copolymer of an olefinic cyclic compound with an alkene, as typified by a styrene-isobutylene copolymer, and the other primary material is an organic plastic not only containing hydrogen and carbon but also containing at least one polar element, such as oxygen, nitrogen, chlorine and sulfur, and which for brevity will be referred to as a polar plastic.

The hydrocarbon copolymers may be prepared as disclosed in Patent 2,274,749, such as by copolymerizing styrene and isobutylene at temperatures below about 0° C., e. g. —20° C., —40° C., —80° C., —100° C. or even lower, in the presence of a Friedel-Crafts catalyst such as aluminum chloride, boron fluoride, etc., preferably in the presence of an inert volatile organic liquid serving as a solvent and/or refrigerant. The temperature may, for instance, be —10° C., —50° C., —90° C., —103° C. (the boiling point of liquid ethylene), or even lower. By adjusting the proportions of the two raw materials, and the temperature of copolymerization, copolymers of desired hardness, melting point, plasticity, etc. may be obtained.

Instead of isobutylene, other aliphatic olefins may be used, preferably having more than two carbon atoms and preferably iso-olefins having four to eight carbon atoms, such as isopentene (2-methyl-1-butene) or a normal pentene obtained by dehydration of secondary amyl alcohol.

Instead of styrene, other materials may be used such as alpha methyl styrene, para methyl styrene, indene, terpenes, etc.

The copolymerization is effected by mixing the two reactants, with or without a mutual solvent, such as ethylene, propane, butane, methyl chloride, refined naphtha, etc., and then after cooling the reactants to the desired low temperature, adding an active halide catalyst such as boron fluoride, or activated boron fluoride catalyst (e. g., .1% ether added), aluminum chloride, titanium tetrachloride, aluminum alkoxide - aluminum chloride complex (AlCl$_3$.Al[OC$_2$H$_5$]$_3$), AlBr$_3$, AlBr$_3$.Al(OC$_2$H$_5$)$_3$, (AlBr$_3$)$_4$.AlOBr and the like. If desired, such catalyst may be dissolved in a solvent such as carbon disulfide, a low molecular weight sulfur-free saturated hydrocarbon, a lower

2 alkyl halide, e. g. methyl chloride or ethyl chloride or a mixture of methyl chloride with butane or propane, at or below the boiling point of the catalyst solvent, and then the catalyst solution cooled down, filtered and added to the reaction mixture. Alternative catalysts include: AlCl$_3$.AlCl$_2$OH, AlBr$_3$.AlBr$_2$OH, AlBr$_2$Cl.AlOCl, AlBrCl$_2$.AlOBr, TiCl$_4$.AlCl$_2$OH, TiOCl$_2$.TiCl$_4$, AlBr$_3$.Br$_2$.CS$_2$, AlBr$_3$.Br$_4$.CS$_2$, BF$_3$-isopropyl alcohol complex, BF$_3$ solution in ethylene, activated BF$_3$ catalyst in ethylene solution, activated BF$_3$ catalyst in methyl chloride solution. Volatile solvents or diluents, e. g. propane, ethane, ethylene, methyl chloride, carbon dioxide (liquid or solid), etc. may also serve as internal or external refrigerants to carry off the liberated heat of polymerization. After completion of the copolymerization, residual catalyst may be hydrolized with alcohol, for example, isopropyl alcohol, or water, or both, and removed by washing the product with water and preferably also with dilute aqueous caustic soda.

The resulting solid copolymer may range from a viscous fluid or a relatively stiff plastic mass to a hard, resinous solid, depending upon the temperature of polymerization, the yield of polymer obtained upon the active feed, the type and concentration of catalyst, the proportion of cyclic reactant in the feed, and the temperature at which the physical texture is observed. The proportions in which the styrene and isobutylene have actually combined during copolymerization may be determined by interpolation of a carbon-hydrogen analysis between the limits:

|  | Carbon | Hydrogen |
|---|---|---|
|  | Percent | Percent |
| Pure styrene | 92.3 | 7.7 |
| Pure isobutylene | 85.7 | 14.3 |

Generally the molecular weight of the product will range from about 800 upwards, for instance, 3,000, 5,000, 25,000, 60,000, 100,000, or much higher, the larger molecular weights, larger intrinsic viscosity (greater than 0.6) and greater plasticity of polymer product at room temperature being obtained at lower polymerization temperatures, e. g. —75° C. to —103° C. and with lower content of cyclic reactant, e. g. 10% to 40%, or 50%; on the other hand, with relatively higher polymerization temperatures such as —40° C. or —20° C., and with higher proportion of cyclic material, e. g., 50–60% or more, the resulting copolymers are lower in molecular weight and intrinsic viscosity, and have a harder texture.

For convenience and brevity the above-described copolymer of a cyclic polymerizable material and an olefin will be referred to as a cycalkene copolymer, or more simply a cycalkene. The specific type of copolymer made from styrene and isobutylene will similarly be referred to for brevity as stybutene. The invention will be illustrated as applied particularly to stybutene, although it is not to be limited specifically thereto.

In referring to the stybutene, or more broadly the cycalkene, it is also intended to include not only such simple copolymers per se, but also such copolymers as modified by having various additives homogeneously compounded therewith as by milling or kneading or solution, as for instance, plasticizers and hardening agents, such as paraffin wax, petrolatum, beeswax, ceresin, synthetic waxy materials such as hydrogenated castor oil, high molecular weight polyethylene, asphalt, tar, lanolin, zinc stearate, zinc dilinoleate, polybutene having a molecular weight of at least 2,000, e. g. 15,000, 60,000, 100,000 or more, fatty oils such as linseed or other drying oils, polystyrene or other hardening agents such as a phenol rubber product made according to Patent 2,158,530, e. g. by treating beta-naphthol with rubber, as well as other additives such as clay, carbon black or other fillers, pigment dyes, antioxidants such as di-ortho-tertiary butyl derivatives of para cresol, tertiary butyl catechol, phenyl beta-naphthylamine, hydroquinone, as well as ultraviolet light absorbing substances, e. g. aesculin, quinine, etc.

A still further modification of the hydrocarbon copolymer element of this invention may be obtained by adding a small amount such as 0.1% to 20%, preferably 1 to 5% of a diolefin such as isoprene into the mixture of styrene and isobutylene or other reactants being copolymerized. This diolefin makes the resulting tripolymer slightly unsaturated, having an iodine number ranging from about 1 to 75, so that its surface may become slightly harder upon later oxidation. This slight unsaturation also gives this resinous hydrocarbon plastic the ability to be vulcanized or cured by treatments somewhat similar to those used for vulcanizing a synthetic rubber made by low temperature copolymerization of isobutylene in the presence of a small amount of a polyolefin of 4 to 12 carbon atoms such as 1 to 3% of isoprene or somewhat larger amount, e. g. 5 to 10% or so of butadiene.

The other primary element of the products and articles made according to this invention is a body, which may be either a thick mass or a thin film, of a polar plastic, such as referred to at the beginning of this specification. Typical materials which may be used for this purpose include regenerated cellulose or other cellulosic materials such as cellulose acetate or cellulose acetate-butyrate, ethyl cellulose, nitro cellulose, etc., any of which cellulosic materials may or may not be plasticized with suitable materials known to the art such as methyl phthalyl ethyl glycolate. Other types of polar plastics include phenol-formaldehyde resins of various types known to the art, urea formaldehyde plastics, glycerol phthalic anhydride plastics, polyvinyl acetate, polyvinyl chloride, polyvinyl alcohols, polyvinyl copolymers e. g. acetate-chloride, polyvinylidene chloride, polyesters such as those made by polymerization of 12-hydroxy stearic acid, gelatin, and polyamides such as those formed by polymeric condensation of diamino and dicarboxylic organic compounds such as the product marketed under the trade-name Nylon, olefin polysulfide condensation products such as those formed by condensation of ethylene dichloride with sodium tetrasulfide, and marketed under the trade-name Thiokol, as well as halogenated derivatives of rubber such as chlorinated cyclicized natural rubber.

In preparing the polar plastics for use according to this invention, various additives may be incorporated therein by milling, kneading, solution, etc., such as powdered inorganic or organic fillers, pigments, dyes, plasticizers, or hardening agents, antioxidants, etc.

The above described two primary elements, namely the hydrocarbon copolymer and the polar plastic, may be brought into conjoint use in a number of different ways, such as by coating a body of one by a thin film of the other, applied either molten or dissolved in a volatile solvent which is later evaporated, or by laminating one or more layers of each element together by sufficient heat and pressure to bond the plurality of layers together. A further modification is to impregnate a fibrous material such as paper or cloth or wood, or even just coat or impregnate one surface of such material with one element and then apply the film or sheet of the other element thereto, either by heat sealing or by use of an intermediate adhesive layer. Suitable adhesives for such purpose include polybutene such as mentioned hereinbefore as a plasticizer, or some of the various natural or synthetic waxes, resins, gums, etc., or even adhesive compositions comprising at least one of the two main elements either dissolved in or softened by a volatile solvent, or softened by a suitable plasticizer.

The laminated or other conjoint products of this invention may be used alone, such as for use as a flexible wrapping sheet material which is moisture-proof, tough, durable, and preferably also resistant against softening or penetration by oils such as mineral oils or fatty oils. For instance, a colorless, transparent sheet of regenerated cellulose having a thickness of approximately 0.001 inch, or such a sheet containing a small amount of clear color such as a green dye, an orange dye, red dye, etc., may be laminated with a thin sheet or film of stybutene, so that the resultant laminated sheet material makes a practically ideal transparent wrapping material, for instance, for wrapping food such as butter, meat, bread, etc. or for wrapping dried foods which must be stored over a long period of time and yet must not be permitted to absorb moisture, such as dried bananas, dried chicken, meat, etc. Such a wrapping material may also be used either in the very thin, flexible form, or in a slightly thicker and more rigid form for packaging frozen foods, particularly because this combination wrapping material retains its flexibility, moisture-proofness, and other desirable characteristics even at temperatures substantially below freezing. In using such wrapping material, if the substance to be wrapped is one containing a high proportion of water or has an essentially non-fatty surface, either dry or wet, it is best to use the stybutene side as the inside surface of the wrapper coming in contact with the product being wrapped. On the other hand, if the food or other product being wrapped has a surface which is oily or fatty in nature the wrapper may be reversed so that the stybutene surface is on the outside and the regenerated cellulose surface is on the inside, because fats and fatty oils have a sufficient solubility in the stybutene copolymer that such surface may become unduly softened. An alternative modification, for use in wrapping materials of a fatty or oily nature, is to laminate two sheets of regenerated cellulose with one intermediate sheet or film of moisture-proofing stybutene, or if only one sheet of regenerated cellulose is used, then the exposed surface of the stybutene may be coated with a thin film of a volatile solvent solution of a polar plastic in which fats and oils have no solvent action, such as a solution of regenerated cellulose, cellulose acetate, etc. in amyl acetate or a mixture thereof with a ketone, such as acetone, methyl ethyl ketone, etc.

In case the colorless, transparent sheet material is not likely to come in contact with mineral or fatty oils, a suitable modification of the invention comprises a single sheet of regenerated cellulose having a thin film of stybutene applied on each side thereof by passing a continuous sheet of the regenerated cellulose through a bath comprising essentially a volatile solvent solution of the stybutene, e. g., a 10% solution of stybutene having an average molecular weight of about 60,000 and dissolved in toluene. In manufacturing such a sheet material the volatile solvent can, of course, be recovered for re-use. After the volatile solvent has been evaporated from such a coated sheet, it may, if desired, be passed through a bath in order to coat both sides with a thin film of a volatile solvent solution of an oil-proof polar plastic such as regenerated cellulose, cellulose acetate, etc.

Products made according to this invention have a large number of advantages over products heretofore available, because the two primary elements of the present products have special characteristics, each not only serving its own function in a separate way, but also in cooperation, in many cases mutually protecting each other against the undesirable effect of moisture, oils, chemicals, light, heat, oxygen or other deteriorating influences. One advantage contributed particularly by the stybutene element is its resistance to moisture vapor penetration, which may, if desired, be even further improved by dissolving or otherwise compounding into the stybutene a small amount of wax or polybutene, etc. Another advantage is that stybutene and other cycalkene copolymers are much more resistant to depolymerization or other deterioration by ultraviolet light than other high molecular weight polymers such as polybutene which are otherwise very suitable for use as an adhesive coating agent either alone or in conjunction with materials such as paraffin wax. A still further advantage, which is of particular use when the products of this invention are intended for use as electrical insulation mediums such as for insulating electric wires, cables, etc., especially those carrying high voltages, is that the cycalkene copolymers are substantially resistant to gas formation when subjected to the influence of high voltage electricity such as corona discharge, etc. For such electrical insulation purposes the stybutene layer or film can be still further improved by having dissolved therein some high molecular weight polystyrene, which is compatible therewith, even though it is not compatible with other high molecular weight hydrocarbon polymers such as polybutene.

Other advantages accruing from the invention, particularly when the products made are intended to be used as flexible wrapping materials, include the fact that the cycalkene copolymer can generally by control of its manufacture be made with the desired flexibility and texture so that no plasticizer is acquired, and furthermore, these copolymers are exceedingly tough and have high tear resistance, considerably higher than those of many polar plastic sheet materials, such as regenerated cellulose, etc. On the other hand, the exceedingly smooth, shiny, non-tacky surface of regenerated cellulose sheets and other polar plastics is highly advantageous for coating or laminating on the surface of stybutene, which sometimes tends to soften in case of frequent handling, due to a slight absorption of oils from the fingers.

When laminated products are prepared, such as for use as wrapping paper, etc., the edges may be fused or heat sealed together, or one particular layer may be permitted to protrude beyond the other layers and then lapped over the other layers and bonded by heat sealing or by a suitable adhesive.

Laminated sheet materials made according to this invention may, if desired, be used alone, for instance, as a flexible wrapping material if very thin, i. e. having a thickness of less than 0.005 inch and preferably not more than about 0.002 inch, or as a window material, i. e. a glass substitute if the products are used in sufficient thickness to give required rigidity, i. e. at least 0.01 inch for small sheets and at least about 0.05 inch for larger sheets such as 2 feet square or larger. For such use as windows, these products have numerous advantages over glass, such as greater toughness with resultant low breakage costs, lighter weight which enables saving in weight in regard to the window frames, greater transmission of ultraviolet light which means better health for humans and better plant growth in greenhouses and under skylights, and also these laminated plastic windows are sufficiently flexible to permit making curved windows.

The conjoint plastic products of this invention may also be used as a coating on a base which may be either flexible or rigid, such as paper, cloth, metal foil (such as for use as thin, flexible wrapping material or for making the laminations of an electric condenser), or may be used as electrical insulation such as spiral wrapping around an electrical wire or cable or it may be applied by extrusion or strip coating, or the successive layers may be applied from solution in a volatile solvent. These conjoint products may also be applied to wood, plywood, rigid plastics such as molded articles, tile, etc. One or more successive layers may be sprayed molten or in volatile solvent solution on to the base or they may be applied thereto by heat sealing, preferably under pressure.

The laminated products of this invention, either used alone or in conjunction with one or more layers of flexible fibrous sheet materials such as paper or cloth, are also particularly adaptable for the construction of containers such as boxes, cans, tubes, collapsible tubes, such as for tooth paste, paints, etc. When use in a clear, transparent condition without any opaque materials such as paper, cloth, etc., they have a definite advantage over similar articles made of metal foil, in that the transparency permits seeing the content of the container without opening it. These products may also be used in the preparation of drug and medicine ampules, for instance, a gelatin coated with stybutene, or two layers of gelatin with an intermediate layer of stybutene, makes a sealed ampule which has a much greater resistance to moisture vapor penetration than an ampule made of gelatin alone. Similarly, capsules having a removable lid portion can be advantageously made for containing drugs, medicines, chemicals, foods, etc. in the form of powder, pills or tablets, etc. Bottle caps and other container closures can also be made of these component products.

Another novel use of the products of this invention is for the construction of humidostat elements, namely, by the preparation of bi-plastic strips, having for instance one side made of a cellulosic film or sheet which is capable of absorbing moisture from the air and therefore expands and contracts according to the moisture content of the air, while the other side of the bi-plastic strip may be made of a film or sheet of stybutene which is not effected by moisture changes in the air; such a bi-plastic strip will consequently bend in one direction or the other according to the changes in moisture content of the air and by making electrical contact when it bends in each direction, the instrument may be used to control equipment adapted to either increase or decrease the humidity content of the air as required.

Figure 2:
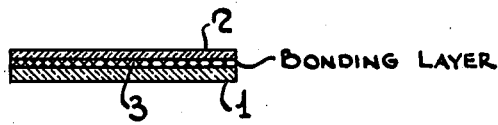
Figure 3:
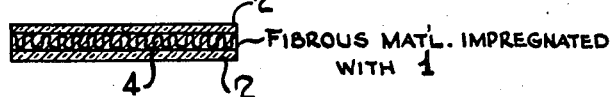
Figure 4:
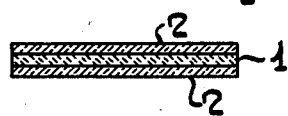
Figure 5:
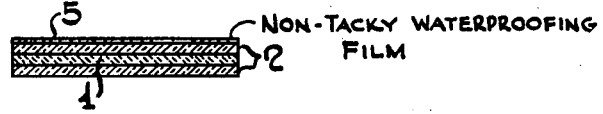
Figure 6:
Figure 7:
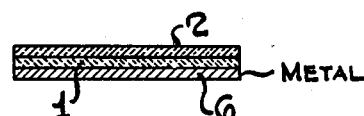
Figure 8:
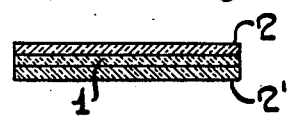
Figure 9:
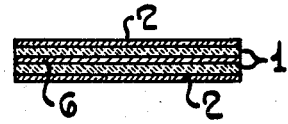
Figure 10:
Figure 11:
Figure 12:
Figure 13:
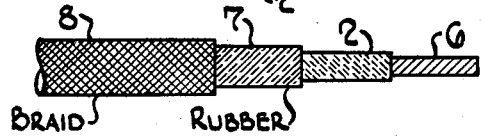

The objects and advantages of the invention will be better understood from a consideration of the accompanying drawing in which Figure 1 represents a cross-section of a two-layer laminated product, Figures 2, 3 and 4 are cross-sections of three-layer laminated products with alternative arrangement of the layers, Figure 5 is a cross-section of a product similar to that shown in Figure 4, except with the addition of another layer. Figures 6, 7 and 8 are cross-sections of still further alternative arrangements of three-layer laminated products, Figure 9 is a cross-section of a five-layer laminated product, Figures 10 and 11 are enlarged cross-sections of a bi-plastic filament, with alternative arrangements of the two different plastic elements, Figure 12 is similar to Figure 11 except for the addition of a third outer layer, and Figure 13 is a longitudinal section of an insulated electrical conductor which part is cut away to show the construction. In all of these figures like reference numerals refer to like types of materials.

Referring to Figure 1, the reference numeral 1 indicates a layer of hydrocarbon plastic, by which is meant a hydrocarbon plastic of this invention, namely a cycalkene copolymer, e. g. stybutene, and this is laminated to a polar plastic 2.

Figure 2 shows a laminated product in which a layer of hydrocarbon plastic 1 is bonded with a polar plastic 2 by an intermediate bonding layer 3, which may, for instance, comprise an adhesive such as polyisobutylene, paraffin wax, or a mixture of the two, or other suitable adhesive plastic compositions, such as those described hereinbefore.

Figure 3 shows a three-layer laminated product in which the middle layer 4 comprises a fibrous sheet material such as paper or cloth impregnated with a hydrocarbon plastic 1, and this middle layer is coated on each side with a relatively thin film of polar plastic 2.

In Figure 4, two exterior layers of polar plastic 2 such as thin sheets of regenerated cellulose, are bonded with an intermediate layer of hydrocarbon plastics, e. g. stybutene. In Figure 5 the laminated product is identical with that in Figure 4 except for the further addition on one side, of a thin film of a non-tacky water-proofing film 5.

Figure 6 shows a middle layer of polar plastic, such as a thin sheet of regenerated cellulose or of cellulose acetate, etc., coated on each side with a thin film of hydrocarbon plastic, e. g. stybutene. Figure 7 shows a thin sheet of metal foil 6 bonded with a thin layer of hydrocarbon plastic 1, e. g. stybutene, to an outer layer 2 of polar plastic.

Figure 8 is identical with Figure 4 except that the two outer layers of polar plastic 2 and 2' are shown to be made of two different polar plastic materials; for instance, the upper layer of polar plastic 2 may be a thin sheet of regenerated cellulose while the lower layer of polar plastic 2' may be a thin sheet or film of gelatin.

Figure 9 shows a central layer of metal foil 6 bonded on each side by a thin layer of hydrocarbon plastic 1 to an outer layer of polar plastic 2.

Figure 10 shows a cross-section of a bi-plastic filament, greatly enlarged, in which the central portion or core is an extruded or drawn filament of hydrocarbon plastic 1, while the cylindrical coating is composed of a polar plastic 2; such a composite filament may be readily prepared by extruding a hydrocarbon plastic such as stybutene in the form of a thin filament, having for instance a thickness of 0.001 inch which may be coated by dipping into a volatile solvent solution of polar plastic 2, such as a solution of regenerated cellulose or cellulose acetate and the like. Such a filament or a thread composed of a plurality of such filaments, may be used for weaving into cloth, and used for instance in making stockings, socks, or other articles of clothing such as suits, dresses, shirts, underwear, raincoats, etc., as well as tent fabric, flexible automobile tops, etc.

Figure 11 shows a cross-section of a bi-plastic filament having a construction the reverse of that shown in Figure 10, namely that in this case the central portion or core composed of a polar plastic, which may for instance be the filament of cellulose acetate or of a polyamide such as that marketed under the trade name Nylon, having a thin outer coating of a hydrocarbon plastic 1 which may for instance comprise a stybutene, preferably having a combined styrene content of at least 50 or 60%, if desired, modified by having dissolved therein a small amount of polystyrene, or paraffin wax, high molecular weight polyisobutylene, etc., to prevent this outer film from being or becoming tacky.

Figure 12 shows an enlarged cross-section of a composite plastic filament similar to that shown in Figure 11 except that it also comprises a third or outer film of polar plastic 2 or 2', indicating that this outer film of polar plastic may either be composed of the same material as the central or core portion of polar plastic 2, or it may be of a different type of polar plastic. For instance, this three-layer filament may comprise a strong central portion or core of polyamide such as nylon, coated first with a thin film of stybutene to make it resistant to water or moisture, and finally an outer film of polar plastic such as cellulose acetate. These two middle and outer layers may be applied by passing the central core filament through a bath of volatile solvent solution of stybutene first and then through a bath of volatile solvent solution of cellulose acetate, permitting the solvent to evaporate after each dipping.

Figure 13 shows an insulated electrical conductor comprising a central metal conductor 6 coated first with a layer of hydrocarbon plastic, e. g. stybutene, which may be applied by extrusion, spiral wrapping or any of the other methods mentioned heretofore or known to the art, and then with a layer of polar plastic 2 such as regenerated cellulose which may be applied by spiral wrapping or any of the other methods mentioned heretofore or known to the art, and then with a layer of polar plastic 2 such as regenerated cellulose which may be applied by spiral wrapping, or a cellulose acetate which may be applied by passing the coated conductor through a bath of volatile solvent solution of cellulose acetate, then after complete evaporation of the solvent (if such was used) applying a layer of rubber, suitably by extrusion, after which it is preferably vulcanized and finally given the usual outer covering of braid. Such an electrical conductor has several unexpected advantages over products used heretofore, because the layer of stybutene is a pure homogeneous hydrocarbon and has excellent electrical resistant properties and bonds very firmly to the metal conductor 6, and has, particularly when composed of a relatively high proportion of cyclic constituents, e. g. a stybutene having at least 50 or 60% of combined styrene content, sufficient resistance to cold flow that the electrical conductor will not shift radially through the hydrocarbon plastic, as is one disadvantage of some softer types of hydrocarbon plastics used heretofore. Another advantage is that the layer of stybutene bonds excellently with the next layer of polar plastic, such as regenerated cellulose, and therefore prevents longitudinal slipping of such regenerated cellulose in respect to the metal conductor 6 during the manufacture of such insulated conductor. Also, the stybutene is quite resistant to breakdown under the influence of high voltage electricity, and therefore is advantageously placed immediately in contact with the electrical conductor 6; this immediate direct contact with the metal is also advantageous because the stybutene is a pure saturated hydrocarbon and has no tendency to cause or permit oxidation or corrosion of the metal conductor, whereas if an unsaturated hydrocarbon material such as rubber is placed immediately next to the electrical conductor, particularly one made of copper, oxygen is readily absorbed by the rubber and then transmitted to the conductor and causes corrosion, apparently the copper having some accelerating influence on the oxidation of the rubber.

In addition to the examples described above in reference to the drawing, the following additional examples will further illustrate the objects and advantages of the invention.

*Example 1*

A thin, colorless, transparent sheet of regenerated cellulose having a thickness of about 0.001 inch was coated with a thin film of a solution containing about 10 to 15% by weight of a stybutene of 50% combined styrene content and made at −103° C., dissolved in a volatile aromatic solvent comprising a major proportion of toluene. The solvent was evaporated, leaving a thin, moisture-proof hydrocarbon copolymer coating on the regenerated cellulose.

*Example 2*

A sheet of stybutene of 50% combined styrene content and made at −103° C., which sheet was tough, flexible, and non-tacky and had a thickness of about 0.02 inch, was wetted on one side with a solution of about 20% by weight of the same copolymer as dissolved in a volatile aromatic solvent as described in Example 1. After partial evaporation of the solvent, and while the surface was still sticky, a thin, colorless, transparent sheet of regenerated cellulose having a thickness of about 0.001 inch was pressed on to the sheet of the stybutene. The resultant laminated sheet material was very suitable for use as a substitute for leather, having a smooth, shiny regenerated cellulose coating on one side but with a thick water-proof leathery type hydrocarbon copolymer backing to give it required strength and rigidity but still retained flexibility.

*Example 3*

A sheet of regenerated cellulose and a sheet of stybutene were both softened on one side with methyl isobutyl ketone and then the two softened surfaces were bonded together by pressing. After eventual evaporation of the residual volatile solvent, the resultant laminated product was found to be very firmly bonded together. Tensile tests by the use of the Thwing Research Sealing Tester indicated a bond strength at room temperature of 65 dynes per 2 square inches.

*Example 4*

A sheet of plasticized polymerized vinylidene chloride was coated with 12% toluene solution of stybutene having a combined styrene content of about 70% and made at −103° C. The resultant product was a clear, colorless, transparent sheet material having extremely low moisture vapor penetration, good tear resistance, and good flexibility. Similarly such a sheet of polymerized vinylidene chloride can be coated on both sides with stybutene, and alternatively two thin sheets of polymerized vinylidene chloride may be bonded together with a thin adhesive layer of stybutene.

*Example 5*

A thin sheet of regenerated cellulose having a thickness of about 0.001 inch is coated on one side with a volatile solvent solution of cellulose acetate, and after evaporation of the solvent, is further coated on the same side with a volatile solvent solution of stybutene, similar to the solution used in Example 1. Good results are also obtained by applying a sheet of thin stybutene to the coated regenerated cellulose, instead of applying a volatile solvent solution and stybutene; this can best be done by bonding the sheets together under pressure just before evaporation of the last traces of the volatile solvent from the cellulose acetate film.

*Example 6*

Two colorless, transparent sheets of regenerated cellulose having a thickness of about 0.001 inch are bonded together by an intermediate thin sheet of stybutene having an average molecular weight of about 60,000, using heat and pressure to effect the bonding. Good results can also be obtained by compounding small amounts of paraffin wax and/or high molecular weight polybutene with the stybutene when used for thus bonding two layers of regenerated cellulose.

*Example 7*

Two colorless, transparent sheets of cellulose acetate having a thickness of about 0.001 inch are bonded together by an intermediate thin sheet of stybutene having an average molecular weight of about 60,000, using heat and pressure to effect the bonding. Good results can also be obtained by compounding small amounts of paraffin wax and/or high molecular weight polybutene with the stybutene when used for thus bonding two layers of cellulose acetate.

Example 8

Two colorless, transparent sheets of regenerated cellulose having a thickness of about 0.001 inch are bonded together by an intermediate thin sheet of stybutene having an average molecular weight of about 60,000, using heat and pressure to effect the bonding. Good results can also be obtained by compounding small amounts of paraffin wax and/or high molecular weight polybutene with the stybutene when used for thus bonding two layers of regenerated cellulose, except that one outer layer consists of cellulose acetate while the other outer layer consists of regenerated cellulose.

Example 9

A thin sheet of cellulose acetate is coated with a thin film of stybutene having an average molecular weight of about 80,000 and having a combined styrene content of about 50% by heat sealing the two thin sheets together, and then the stybutene surface is coated with a thin film of a toluene solution of polystyrene. After evaporation of the solvent, a hard non-tacky polystyrene surface is left on one side to protect the stybutene from contact with mineral or fatty oils, while the stybutene greatly increases the moisture resistance of the cellulose acetate.

Example 10

A thin sheet of regenerated cellulose having a thickness of about 0.001 inch is coated with a thin film of a volatile solvent solution, i. e. a naphtha solution, of a polybutene having an average molecular weight of about 80,000 and after evaporation of the naphtha, a thin sheet of stybutene having a combined styrene content of about 60% and made at −103° C., is applied to the polybutene surface with pressure in order to obtain a firm bond between the regenerated cellulose and the stybutene. A sheet of cellulose acetate can be used in place of the regenerated cellulose in such a laminated product.

Example 11

A thin sheet of regenerated cellulose is bonded to a thin sheet of plasticized polymerized vinylidene chloride by an intermediate bonding layer of stybutene.

Example 12

A thin sheet of stybutene having a thickness of about 0.001 inch and comprising a stybutene of about 60% combined styrene content made at −103° C., is coated with a volatile solvent solution of a phenol formaldehyde resin. Similarly, a urea formaldehyde resin can be used in place of the phenol formaldehyde resin.

Example 13

Two thin sheets of plasticized vinyl acetate-chloride copolymer are bonded together with an intermediate adhesive, water-proof and moisture-proof layer of stybutene.

Example 14

Two thin sheets of polyamide plastics marketed under the trade name Nylon are bonded together with a thin, adhesive, moisture-proof film of stybutene.

Example 15

Example 14 is duplicated except that a thin sheet of regenerated cellulose is used in place of one of the sheets of polyamide

Example 16

A sheet of regenerated cellulose having a thickness of about 0.001 inch is coated with a thin volatile solvent solution of stybutene, such as used in Example 1, and after evaporation of the solvent is laminated by heat sealing with a sheet of aluminum foil having a thickness of .0002 inch, using the stybutene to bond the aluminum foil to the regenerated cellulose.

Example 17

Example 16 is duplicated except that a small amount of polybutene, e. g. 5% of polymer having an average molecular weight of about 80,000 is added to the volatile solvent solution of the stybutene before application to the surface of the regenerated cellulose.

Example 18

Example 17 is duplicated except that a sheet of plasticized polymerized vinylidene chloride is used in place of the sheet of regenerated cellulose.

Example 19

Example 18 is duplicated except that the aluminum foil is coated on both sides with the polymerized vinylidene chloride using the hydrocarbon adhesive as bonding agent.

Example 20

Example 19 is duplicated except that the aluminum foil is coated on both sides with regenerated cellulose instead of polymerized vinylidene chloride.

Laminated sheet materials containing extremely thin sheets of aluminum foil such as described in Examples 16 to 20 are extremely attractive and useful as flexible wrapping material, because they permit the use of much thinner aluminum foil than could possibly be used without the two different types of plastics.

Example 21

A thin sheet of stybutene having a combined styrene content of 50% and made at −103° C. is coated on each side with a volatile solvent solution of chlorinated cyclicized rubber, the film of the latter being only of sufficient thickness to impart a smooth, hard, non-tacky surface to the stybutene, while the middle layer of stybutene imparts strength, toughness and flexibility to this laminated product.

Example 22

Example 21 is duplicated except that instead of using a sheet of stybutene per se, a thin sheet of silk is used which has been impregnated and coated with stybutene to make a completely water-proof and moisture-proof cloth.

Example 23

80% by weight of a stybutene having a combined styrene content of about 60% and made at −103° C., is homogeneously compounded with 20% by weight of polyethylene having an average molecular weight of about 30,000 by hot milling, and then calendered in a thin film between two sheets of regenerated cellulose having a thickness of about 0.001 inch.

Example 24

A thin sheet of regenerated cellullose having a thickness of about 0.001 inch is laminated by heat and pressure with a thin sheet of polyethylene likewise having a thickness of about 0.001 inch, by using an intermediate bonding layer, just thick enough to give good bonding, of a stybutene having a combined styrene content of about 40% and made at —103° C. The stybutene gives a much better bonding between the polyethylene and the regenerated cellulose than these two materials would have without the intermediate stybutene.

It is not intended that this invention be limited to specific materials and modifications which have been given merely for the sake of illustration, but only by the appended claims in which it is intended to claim all novelty inherent in the invention as well as all modifications coming within the scope and spirit of the invention.

It is claimed:

1. Laminated sheet material consisting of two sheets of regenerated cellulose with an intermediate layer of a styrene-isobutylene copolymer having an intrinsic viscosity above 0.6 and a combined styrene content of about 50 to 70%.

2. Laminated sheet material having a thickness of not more than about .002 inch consisting of one sheet of regenerated cellulose coated on one side with a film of a styrene-isobutylene copolymer having an intrinsic viscosity above 0.6 and a combined styrene content of about 50 to 70%.

3. A flexible, foldable, moisture-proof transparent laminated sheet material consisting of a layer of regenerated cellulose having a thickness of about .001 inch and a layer of styrene-isobutylene copolymer having an intrinsic viscosity above 0.6 and a combined styrene content of about 50 to 70%.

4. A laminated sheet material comprising a thick layer of regenerated cellulose and at least one thin film comprising a styrene-isobutylene copolymer having an intrinsic viscosity above 0.6 and a combined styrene content of about 50 to 70%.

OBER C. SLOTTERBECK.
WILLIAM H. SMYERS.
DAVID W. YOUNG.

REFERENCES CITED

The following references are of record in the file of this patent:

UNITED STATES PATENTS

| Number | Name | Date |
|---|---|---|
| 2,061,934 | Mueller-Conradi et al. | Nov. 24, 1936 |
| 2,175,672 | Scott et al. | Oct. 10, 1939 |
| 2,213,423 | Wiezevich (Gaylor) | Sept. 3, 1940 |
| 2,270,285 | Frolich | Jan. 20, 1942 |
| 2,274,749 | Smyers | Mar. 3, 1942 |
| 2,278,515 | Gibb | Apr. 7, 1942 |
| 2,300,072 | Smyers | Oct. 27, 1942 |
| 2,356,290 | Wendler | Aug. 22, 1944 |
| 2,369,471 | Latham | Feb. 13, 1945 |
| 2,396,293 | Smith | Mar. 12, 1946 |
| 2,434,662 | Latham et al. | Jan. 10, 1948 |

FOREIGN PATENTS

| Number | Country | Date |
|---|---|---|
| 507,323 | Great Britain | June 9, 1939 |